(12) United States Patent
Choe et al.

(10) Patent No.: US 7,397,813 B2
(45) Date of Patent: Jul. 8, 2008

(54) ALLOCATING BANDWIDTH USING RESILIENT PACKET RING (RPR) FAIRNESS MECHANISM

(75) Inventors: Byung-Gu Choe, Seoul (KR); Jae-Hoon Lee, Seoul (KR); Byung-Chang Kang, Yongin-si (KR); Dong-Heon Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 608 days.

(21) Appl. No.: 10/984,778

(22) Filed: Nov. 10, 2004

(65) Prior Publication Data
US 2005/0100031 A1   May 12, 2005

(30) Foreign Application Priority Data
Nov. 11, 2003   (KR) .................... 10-2003-0079614

(51) Int. Cl.
*H04L 12/40* (2006.01)
*H04L 12/56* (2006.01)

(52) U.S. Cl. ...................... 370/438; 370/404

(58) Field of Classification Search ............ None
See application file for complete search history.

(56) References Cited

U.S. PATENT DOCUMENTS

| 2003/0035371 | A1  | 2/2003 | Reed et al. |
| 2003/0163593 | A1  | 8/2003 | Knightly |
| 2004/0032826 | A1  | 2/2004 | Sridhar |
| 2004/0100984 | A1* | 5/2004 | Nam et al. .......... 370/438 |
| 2004/0103179 | A1  | 5/2004 | Damm et al. |

* cited by examiner

*Primary Examiner*—Huy D. Vu
*Assistant Examiner*—Clemence Han
(74) *Attorney, Agent, or Firm*—Robert E. Bushnell, Esq.

(57) ABSTRACT

In allocating bandwidth using a Resilient Packet Ring (RPR) fairness mechanism in a node connected to an RPR network, when congestion occurs, an amount of traffic that the node has transmitted to a ring during one aging interval is stored together with its own identifier in a fairness message as a fairness transmission rate to be advertised to its own upstream nodes. The amount of traffic transmitted from the upstream node during the aging interval is measured and stored. When the congestion has been solved, an available bandwidth is calculated with reference to the fairness transmission rate and the amount of traffic transmitted from the upstream nodes, and the fairness transmission rate is calculated to fairly allocate the available bandwidth to the upstream nodes so that the fairness transmission rate is transmitted to the upstream nodes.

12 Claims, 11 Drawing Sheets

ALLOCATING BANDWIDTH USING RESILIENT PACKET RING (RPR) FAIRNESS MECHANISM

CLAIM OF PRIORITY

This application makes reference to, incorporates the same herein, and claims all benefits accruing under 35 U.S.C. §119 from an application for METHOD FOR ALLOCATING BANDWIDTH USING RPR FAIRNESS MECHANISM earlier filed in the Korean Intellectual Property Office on 11 Nov. 2003 and there duly assigned Serial No. 2003-79614.

BACKGROUND OF THE INVENTION

1. Field of the Invention

The present invention relates to a method of allocating bandwidth using a Resilient Packet Ring (RPR) fairness mechanism and to a program storage device, readable by a machine, tangibly embodying a program of instructions executable by the machine to perform a method of allocating bandwidth using a Resilient Packet Ring (RPR) fairness mechanism.

2. Description of the Related Art

The current Internet can be classified into three parts, namely, a subscriber network, a metro network and a backbone network. Although the subscriber and backbone networks have been developed to accommodate Internet traffic which has abruptly increased recently, the metro network connecting two networks to each other is constructed as a ring network of a SONET/SDH (Synchronous Optical Network/Synchronous Digital Hierarchy) scheme which is an existing circuit switching scheme. Accordingly, bandwidth is not being used efficiently.

Therefore, a bottleneck occurs in the current metro network and an imbalance of speed occurs in an entire network structure. A metro Ethernet of a packet switching scheme has been suggested as technology to make up for the disadvantages of the SONET/SDH net.

However, although the metro Ethernet has a great merit in that traffic of the current Internet is in packets, it has disadvantages in that a high-speed protection mechanism provided in a point-to-point ring network or mesh topology SONET network cannot be provided since most current metro networks have a ring topology configuration.

Furthermore, the Ethernet also has disadvantages in that it is difficult to embody a mechanism for entire fairness in sharing the bandwidth of the ring. An IEEE 802.17 Resilient Packet Ring (RPR) of a protocol in layer 2 has been suggested as a technology for transmitting the traffic with more efficiency in the metro network by making up for the disadvantages of the existed metro network.

An RPR fairness mechanism is defined in the RPR scheme so that all of the nodes of the ring can fairly use the bandwidth of the ring.

All nodes of the RPR are connected to a dual ring and Media Access Control (MAC) protocols are independently operated for the two rings. The RPR MAC provides Class-A (High Priority), Class-B (Medium Priority) and Class-C (Low Priority) services in accordance with the priority of the traffic. Also, the Class-B service is divided into traffic which observes a predefined Committed Information Rate (CIR) and traffic which does not observe the predefined CIR. The CIR observing traffic is processed in the same manner as the Class-A traffic, and the CIR violating traffic is called an Excess Medium Priority (eMP) traffic and is processed in the same manner as the Class-C traffic.

Only the eMP and Class-C traffic described above are applied to the RPR fairness mechanism. The RPR MAC has addA, addB and addC transmission buffers.

Also, all kinds of control traffic are transmitted to the ring through the addMac transmission buffer in order to control the ring. The nodes in the RPR have ring configurations so that each of the nodes has to perform a role of a transit node which transmits the traffic transmitted by a source node to a destination node.

Accordingly, there are two transit buffers, namely, a Primary Transit Queue (PTQ) and a Secondary Transit Queue (STQ) in the RPR MAC in order to perform the role of a transit node. Also, the STQ transit buffer has two threshold values, a high_threshold and a low_threshold, to find and control congestion. The Class-A traffic from an upstream node is transmitted to a downstream node through the PTQ transit buffer and the Class-B and Class-C traffic from the upstream node are transmitted to the downstream node through the STQ transit buffer.

The RPR fairness mechanism is driven by monitoring an amount of traffic transmitted by an MAC client of the node and an amount of the Class-C and eMP traffic transmitted from the upstream node, and has following parameters in order to control amounts of such traffic.

addRate: measuring the amount of the Class-C and eMP traffic transmitted from its client to a ring.

addRateCongested: measuring the amount of the addRate traffic transmitted from its client to the ring and transmitted to a downstream node after a node in which congestion has occurred.

fwRate: measuring the amount of the Class-C and eMP traffic transmitted to the ring through its STQ transit buffer.

fwRateCongested: measuring the amount of fwRate traffic transmitted to the ring through its STQ transit buffer and transferred to a downstream node after a node in which congestion has occurred.

allowedRateCongested: measuring the amount of the maximum addRate traffic transmitted to the downstream node after a node in which the congestion has occurred. When congestion does not occur in the downstream node, that is, when a fairness transmission rate of a FULL value is received from the downstream node, this value is increased at intervals.

Each of the nodes checks its STQ buffer every aging interval. When the amount of the traffic exceeds the low_threshold, congestion has occurred in the node, and a fair rate and its MAC address are carried on the fairness message and transmitted to an upstream node when a current advertisement interval is completed.

The upstream node which received the fairness message reestablishes its allowedRateCongested value as a fairness transmission rate of the received fairness message. That is, the node which received the fairness message transmits the amount of traffic (Class-C+eMP) transmitted by the node during the next aging interval so as not to exceed the received fairness transmission rate so that the congestion does not occur.

That is, when the amount of addRate (Class-C+eMP) transmitted by a node due to the traffic transmitted from the upstream node is reduced, that node advertises the reduced addRate to the upstream nodes using the fairness message. The upstream nodes which have received this fairness message control their transmission rates so as not to exceed the received fairness transmission rate, and are arranged so that when the traffic inputted from the upstream node is reduced, the addRate of the node in which the congestion has occurred is increased again so that the congestion is resolved.

All nodes of the RPR network transmit the fairness message whenever an advertised interval is completed, and the fairness message includes a fairness transmission rate of a node in which congestion occurs most severely and an MAC address of its node, and the fairness message is transmitted to the upstream nodes in a hop-by-hop scheme. The transmitted fairness transmission rate is the amount of the addRate (Class-C+eMP) which the node in which the congestion currently occurs most severely has transmitted during the previous aging interval.

As described above, the RPR fairness mechanism discussed above has problems in that congestion occurs and the bandwidth which is not used but available is not efficiently used after the congestion has been solved so that the bandwidth usage ratio is low.

The following patents each discloses features in common with the present invention but do not teach or suggest the inventive features specifically recited in the present application: U.S. Patent Application No. 2003/0163593 to Knightly, entitled METHOD AND SYSTEM FOR IMPLEMENTING A FAIR, HIGH-PERFORMANCE PROTOCOL, FOR RESILIENT PACKET RING NETWORKS, published on Aug. 28, 2003; U.S. Patent Application No. 2003/0035371 to Reed et al., entitled MEANS AND APPARATUS FOR A SCALEABLE CONGESTION FREE SWITCHING SYSTEM WITH INTELLIGENT CONTROL, published on 20 Feb. 2003; U.S. Patent Application No. 2004/0100984 to Nam et al., entitled RESOURCE ALLOCATION METHOD FOR PROVIDING LOAD BALANCING AND FAIRNESS FOR DUAL RING, published on May 27, 2004; U.S. Patent Application No. 2004/0032826 to Sridhar, entitled SYSTEM AND METHOD FOR INCREASING FAIRNESS IN PACKET RING NETWORKS published on Feb. 19, 2004; and U.S. Patent Application No. 2004/0103179 to Damm et al., entitled TOPOLOGY MANAGEMENT OF DUAL RING NETWORK, published on May 27, 2004.

SUMMARY OF THE INVENTION

It is, therefore, an object of the present invention to provide a method of allocating bandwidth using an RPR fairness mechanism wherein the bandwidth which is not used but available is efficiently allocated to nodes which are currently transmitting traffic so that a total bandwidth usage ratio is increased, and the bandwidth which is not used but available is evenly allocated to the nodes which are currently transmitting the traffic so that fairness is maintained.

It is also an object of the present invention to provide a program storage device, readable by a machine, tangibly embodying a program instructions executable by the machine to perform the above-noted method.

According to an aspect of the present invention, when congestion occurs, an amount of traffic which the node has transmitted to a ring during an aging interval is recorded together with an identifier in an fairness message as a fairness transmission rate to be advertised to their upstream nodes and stored. The amount of traffic transmitted from the upstream node during the aging interval is measured and stored. When the congestion has been solved, an available bandwidth is calculated with reference to the first fairness transmission rate which was recently advertised and the amount of traffic which has been transmitted from the upstream nodes, and a fairness transmission rate is calculated in order to fairly allocate the available bandwidth to the upstream nodes effectively so that the fairness transmission rate is transmitted to the upstream nodes. The upstream nodes transmit the traffic in accordance with the fairness transmission rate. By doing so, when congestion occurs and is solved in a node, it is possible to effectively use the available bandwidth without any delay time.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
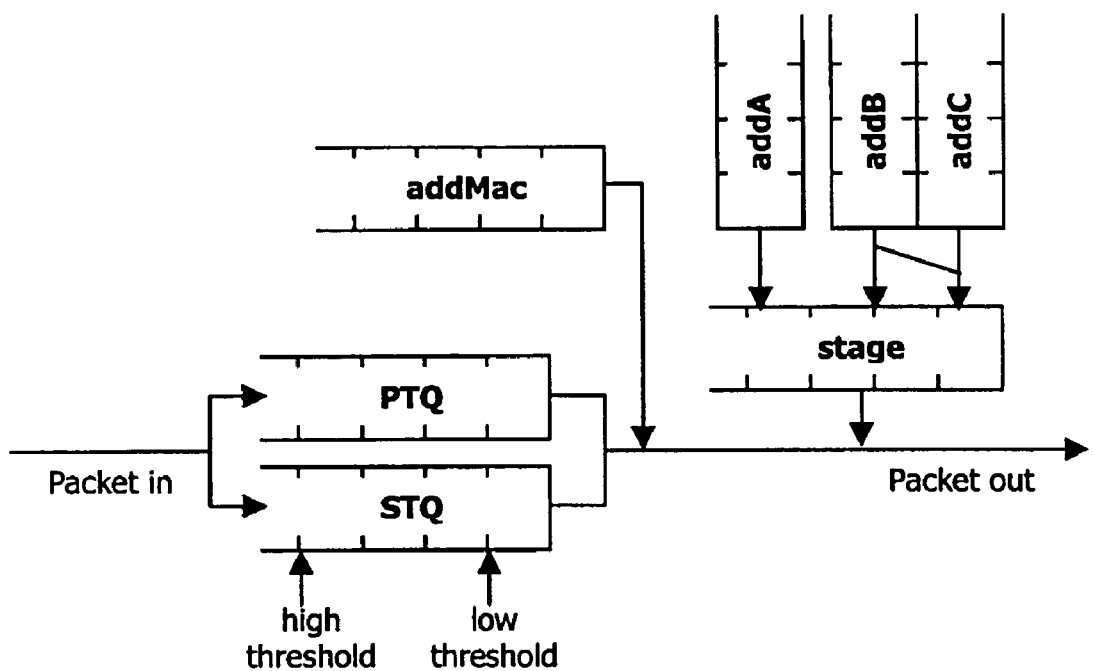
FIG. 1 is a view of an MAC construction of an RPR.

The RPR MAC has addA, addB and addC transmission buffers, shown in FIG. 1, to transmit traffic which has three priorities different with one another as described above, and the three kinds of traffic are transmitted to the ring through a stage buffer.

Figure 2:
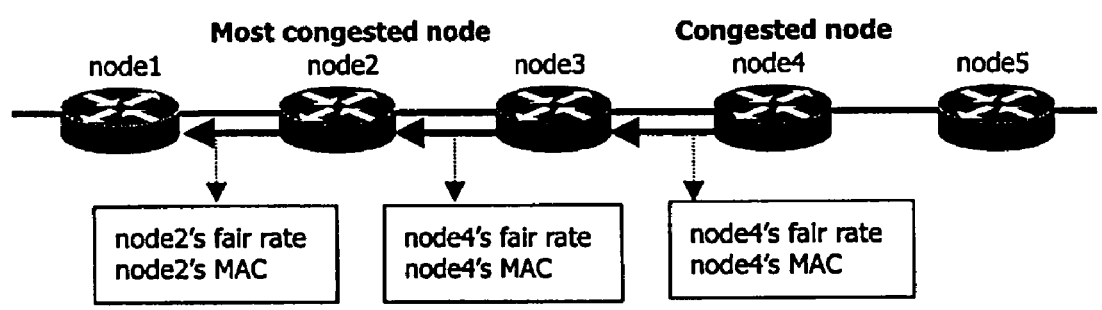
FIG. 2 is a view of a process in which a fairness transmission rate is transmitted to upstream nodes by a method of allocating bandwidth using an RPR fairness mechanism.

FIG. 2 is a view of a process in which a fairness transmission rate is transmitted to upstream nodes by a bandwidth allocation scheme using an RPR fairness mechanism.

In the process in which nodes 1, 2, 3 and 4 transmit traffic to node 5, when congestion occurs in node 4, node 4 records its fairness transmission rate and MAC address in a fairness message and transmits the message to node 3 after a current advertise interval has been completed. Node 3, which has received that message, reestablishes its allowedRateCongested value as the fairness transmission rate received from node 4 and restricts the amount of Class-C and eMP traffic transmitted by the node so as not to exceed the fairness transmission rate transmitted by node 4. When an advertise interval of node 3 has been completed, node 3 carries the fairness transmission rate and MAC address received from node 4 in the fairness message and transmits the message to node 2 to inform node 2 that congestion has occurred in node 4 and to provide the fairness transmission rate. However, when node 2 which has received that message also is currently in a congestion state, a fairness transmission rate of a more congested node between node 2 and node 4 is transmitted to node 1. Accordingly, node 2 compares its own fairness transmission rate with that of node 4 and selects a fairness transmission rate having a smaller value. Since the fairness transmission rate has the smaller value, the addRate amount which transmitted during the previous aging interval of the node is small. That is, a smaller amount of traffic has been transmitted to the ring since severe congestion has occurred. Accordingly, node 2 carries its own fairness transmission rate and MAC address in the fairness message and transmits the message to node 1. When congestion occurs in the RPR network as described above, the congestion can be controlled in the fairness transmission rate of the node in which the congestion has occurred.

After the congestion has been solved in the node in which the congestion has occurred, the node provides notification that the current network has no congestion by advertising the fairness message of a FULL value to the upstream nodes. The upstream nodes which have received the fairness transmission rate of the FULL value increase their allowedRateCongested values. That is, whenever the upstream nodes receive the fairness transmission rate of the FULL value from their downstream nodes, they increase the amount of their traffic transmission. An amount of the increased traffic, $\Delta R$ can be obtained by the following mathematical expression.

$\Delta R$=(MAX_ALLOWED_RATE−allowedRateCongested)/RAMPCOEF    [mathematical expression 1]

MAX_ALLOWED_RATE is the maximum amount of the Class-C and eMP traffic which a node can transmit during one aging interval and the RAMPCOEF is a basic value 4.

new_allowedRateCongested=previous_allowedRateCongested+$\Delta R$    [mathematical expression 2]

The maximum amount of the traffic which the node which has received the fairness message of the FULL value can transmit during the next aging interval is defined by mathematical expression 2 above. It is a sum of the allowedRateCongested of the previous aging interval plus the $\Delta R$ amount obtained from mathematical expression 1. That is, the nodes which have received the fairness message of the FULL value can transmit more traffic than the traffic transmitted during the previous aging interval by the $\Delta R$ amount obtained from mathematical expression 1.

Figure 3:
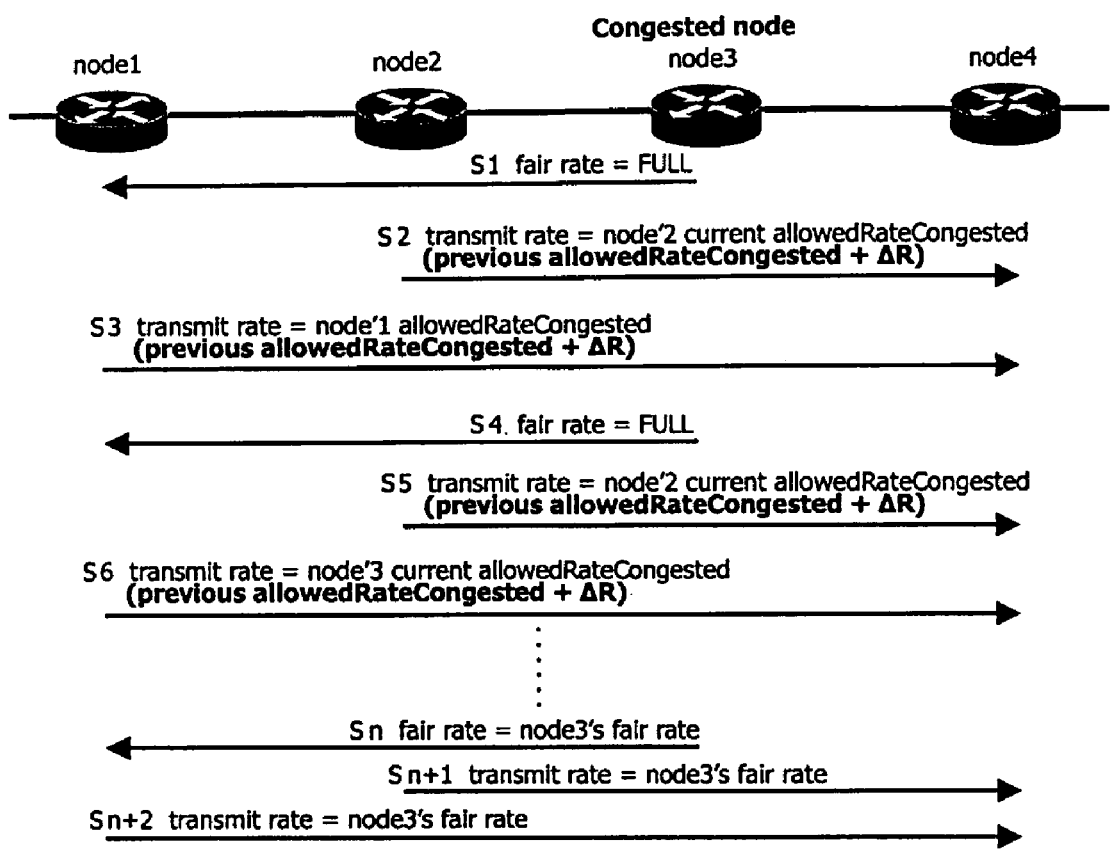
FIG. 3 is a flowchart of an allocation of bandwidth after solving congestion by a method of allocating bandwidth using an RPR fairness mechanism.

FIG. 3 is a flowchart of the allocation of bandwidth after solving congestion by a bandwidth allocation scheme using an RPR fairness mechanism. Referring to FIG. 3, the congestion occurs and then is solved in node 3, and node 3 carries the fairness transmission rate of the FULL value in the fairness message and transmits it to nodes 1 and 2 (S1). Nodes 1 and 2 have received the fairness transmission rate of the FULL value and calculate $\Delta R$ of traffic to be increased in the next aging interval as defined by mathematical expression 1 using their current allowedRateCongested values, and calculate the total traffic, allowedRateCongested, to be transmitted during the next aging interval by adding the $\Delta R$ to the current allowedRateCongested value as defined by mathematical expression 2.

After the current aging interval has been been completed, nodes 1 and 2 transmit the traffic by newly established allowedRateCongested during the next aging interval (S2 and S3). Node 3 has received more traffic than that of the previous aging interval by the $\Delta R$ from nodes 1 and 2 and checks its own STQ buffer, and when the amount of traffic does not exceed a low_threshold, node 3 again transmits a fairness message of the FULL message to nodes 1 and 2 since the congestion has not yet occurred (S4). Nodes 1 and 2 again receive the fairness message of the FULL value and increase the amount of their traffic transmission using mathematical expressions 1 and 2 (S5 and S6). Node 3 continuously transmits the fairness transmission rate of the FULL value to its upstream nodes when the congestion does not occur in node 3 (Sn), and the upstream nodes which have received the fairness transmission rate of the FULL value continue to increase the amount of their traffic transmission regularly (Sn+1 and Sn+2). When the upstream nodes continue to increase the amount of the traffic transmission regularly, congestion again occurs in node 3 and node 3 calculates its own fairness transmission rate and transmits it to nodes 1 and 2 so that the congestion can be controlled.

In the RPR fairness mechanism defined above, when congestion occurs in a node, the transmission amount of the upstream nodes can be controlled in the fairness transmission rate calculated in the node in which the congestion has occurred so that the node can escape from the congestion.

When congestion is solved from the node in which the congestion has occurred, that node transmits the fairness message of the FULL value to the upstream nodes and informs them that the congestion does not currently occur, and the upstream nodes which have received the fairness message of the FULL value increase the amount of their traffic transmissions regularly.

However, the traffic amount is simply increased by a predetermined rate of amount of the traffic which has been transmitted during the previous aging interval without considering currently available bandwidth. That is, the nodes which currently transmit the traffic waste bandwidth in spite of using much more bandwidth. Those nodes have a problem that there is bandwidth useage inefficiency since a bandwidth which is not currently used but is available is not used efficiently.

Figure 4:
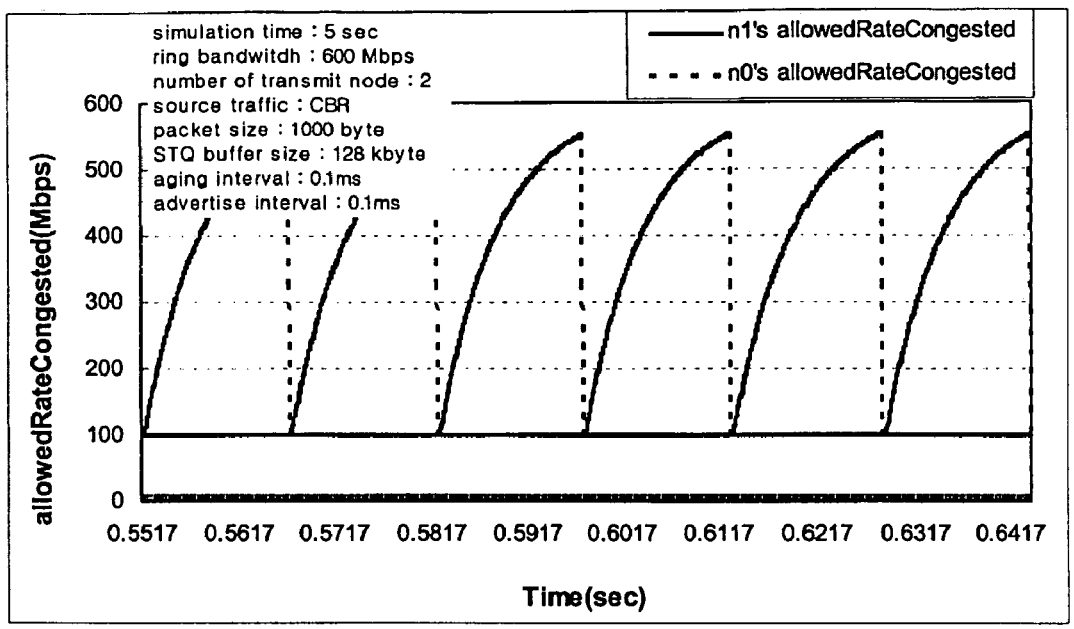
FIG. 4 is a graph of bandwidth usage by a method of allocating bandwidth using an RPR fairness mechanism.

FIG. 4 is a graph of bandwidth usage by a bandwidth allocation scheme using the RPR fairness mechanism discussed above. Referring to FIG. 4, values of the allowedRateCongested of each of nodes 0 and 1 change when nodes 0 and 1 transmit traffic to the downstream node 2. The node 0 transmits the traffic to node 2 in a greedy fashion, and the node 1 fixedly transmits the traffic to node 2 at a rate of 100 Mbps. Since node 1 fixedly transmits the traffic to node 2 at a rate of 100 Mbps, the value of the allowedRateCongested of node 1 keeps the rate at 100 Mbps. When node 0 transmits a great amount of traffic to node 2, congestion occurs in node 1. Node1 in which congestion occurs transmits its fairness transmission rate of 100 Mbps to node 0, and node 0 which has received the fairness transmission rate of 100 Mbps from node 1 reduces its transmission rate to 100 Mbps so that node 1 escapes the congestion. However, when node 1 escapes the congestion, the fairness transmission rate of the FULL value is transmitted to node 0. Even though the bandwidth which is not used but available is 500 Mbps, the transmission rate of node 0 which has received the fairness transmission rate of the FULL value increases gradually so that there occurs a problem in that the bandwidth usage ratio is low.

The present invention will now be described more fully hereinafter with reference to the accompanying drawings, in which exemplary embodiments of the present invention are shown. The present invention can, however, be embodied in different forms and should not be construed as being limited to the embodiments set forth herein. Rather, these embodiments are provided so that this disclosure will be thorough and complete, and will fully convey the scope of the present invention to those skilled in the art. In the drawings, the thickness of layers and regions are exaggerated for clarity. Like numbers refer to like elements throughout the specification.

All nodes connected to an RPR network check their STQ buffers every aging interval and then determine if the amount of traffic exceeds a low_thereshold. That is, a determination is made as to whether congestion has occured in any of the nodes.

If an amount of STQ buffer traffic of one node exceeds the low_threshold, congestion has occurred in that node, and that node records its addRate, that is, the amount of Class-C and eMP traffic which the node has transmitted to a ring during the current aging interval and its MAC address in a fairness message with the amount of traffic as a fairness transmission rate and advertises it to its upstream nodes when the current advertise interval has been completed.

At this time, the node records and maintains the fairness transmission rate which the node has most recently advertised. On the other hand, the upstream nodes which have received the fairness messages from their own downstream nodes reestablish their values of allowedRateCongested to the received fairness transmission rate. That is, the upstream nodes reduce the amount of traffic that they transmit to the received fairness transmission rate. When the amount of traffic transmitted to the ring by the upstream nodes is reduced, the amount of traffic of the STQ buffer of the node in which the congestion has occurred does not exceed the low_threshold and congestion has therefore been solved in the node.

After the congestion has been solved, a fairness transmission rate that the node again advertises to its upstream node is not transmitted by simply carrying the FULL value in the fairness message. Instead, its remaining bandwidth is fairly allocated to the upstream node considering the bandwidth which is not currently being used but is available and the fairness transmission rate is calculated to make the most use of the remaining bandwidth. The node in which the congestion has occurred records and maintains the fairness transmission rate which the node has most recently advertised.

Also, the amount of traffic which is transmitted to its STQ buffer during the current aging interval is also measured, and recorded and maintained. Accordingly, when the amount of traffic which has been transmitted to the STQ buffer during the current aging interval is divided by the fairness transmission rate which the node has most recently advertised, it is possible to predict how many upstream nodes have currently transmitted the traffic to the node since the upstream nodes transmit as much traffic as the node in which the congestion has occurred had advertised in its fairness transmission rate.

Next, the node in which the congestion has occurred calculates how much bandwidth of the current total bandwidth is being used, and how much bandwidth of the current total bandwidth is not being used but is available. If the number of upstream nodes which are transmitting current traffic including the node in which the congestion has occurred is multiplied by the most recently advertised fairness transmission rate, a determination can be made as to how much bandwidth of the current total bandwidth is used and how much bandwidth is not being used but is available. Accordingly, the node in which the congestion has occurred can allocate the bandwidth which is not currently being used but is available to the nodes which are currently transmitting the traffic.

However, when the total bandwidth which is not currently being used but is available is totally allocated to the nodes which are transmitting the traffic, congestion again occurs during the next aging interval. Accordingly, only one half of the bandwidth which is not currently being used but is available is fairly allocated to the nodes which are currently transmitting the traffic.

Such an operation can be expressed as follows.

$N = R/F$ $M = M - (N+1)*F$ $f = (m/2)/N$ [mathematical expression 3]

M: total bandwidth of the ring; m: amount of bandwidth which is not currently being used but is available; F: fairness transmission rate that has been most recently transmitted to the upstream nodes; f: fairness transmission rate after the congestion has been solved; N: the number of upstream nodes that are transmitting traffic to the node after congestion has occurred in the node; and R: amount of traffic that is transmitted to the STQ buffer of the node in which the congestion has occurred during the current aging interval.

The bandwidth which is not being used but is available continues to be allocated to the nodes whenever the aging interval has been completed using the above expressions. However, in order to minimize fluctuations, when a bandwidth that is more than 95% of the total bandwidth is used, the fairness transmission rate of the FULL value is transmitted to the upstream nodes and the amount of traffic transmission is increased by the increase ratio defined in mathematical expression 1 so that congestion does not occur frequently.

Figure 5:
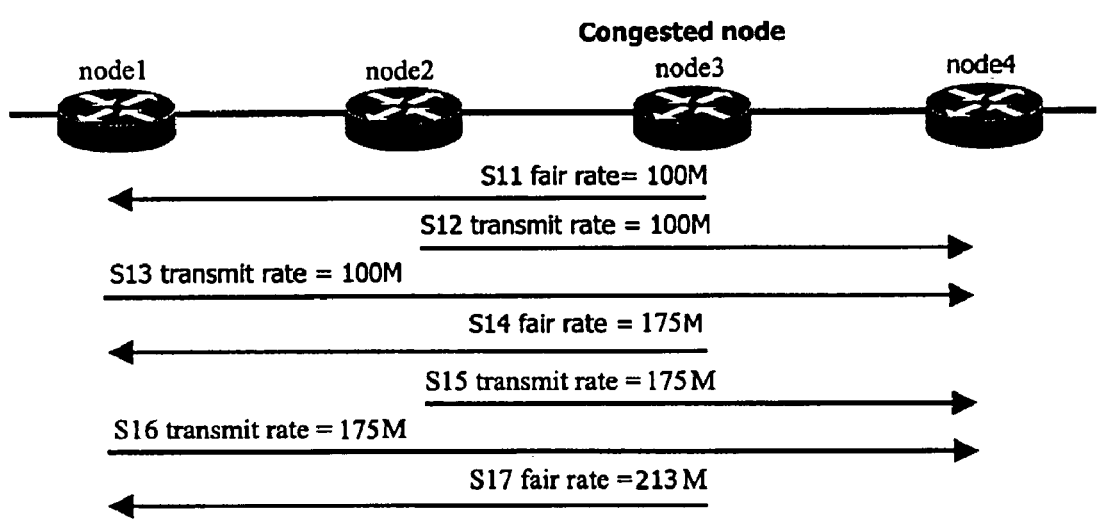
FIG. 5 is a flowchart of bandwidth allocation of a method of allocating bandwidth using an RPR fairness mechanism in accordance with an embodiment of the present invention.

FIG. 5 is a flowchart of a bandwidth allocation of a method of allocating bandwidth using an RPR fairness mechanism in accordance with an embodiment of the present invention. A total bandwidth of a link is 600 Mbps and nodes 1, 2 and 3 transmit traffic to node 4. Node 3 transmits the traffic to node 4 at a fixed transmission rate of 100 Mbps. At this time, if a fairness transmission rate of 100 Mbps is transmitted to the upstream node due to congestion occurring in node 3 (S11), then nodes 1 and 2 transmit traffic of 100 Mbps to the ring during the next aging interval (S12 and S13). Accordingly, when traffic of 200 Mbps is inputted to the STQ buffer of node 3 and the amount is divided by the fairness transmission rate of 100 Mbps which node 3 advertised, it is predicted that 2 upstream nodes are currently transmitting the traffic to node 3.

Also, when the amount of traffic inputted to the STQ buffer is added to the traffic transmitted by the STQ buffer, it is possible to know how much bandwidth of the current total bandwidth is being used and how much is not used but is available. Accordingly, it is understood that a bandwidth of 300 Mbps is used and a current available bandwidth is 300 Mbps according to mathematical expression 3.

Accordingly, since it is possible to additionally allocate 150 Mbps, that is, ½ of 300 Mbps available during the next aging interval, to nodes 1 and 2 that are currently transmitting traffic, that is, 75 Mbps to each of nodes 1 and 2; the fairness transmission rate that is advertised again is transmitted to nodes 1 and 2 as 175 Mbps (S14). Accordingly, nodes 1 and 2 transmit 175 Mbps to the ring respectively during the next aging interval (S15 and S16), and node 3 also transmits 100 Mbps to the ring. Accordingly, it is understood that a bandwidth of 450 Mbps is currently used and a bandwidth of 150 Mbps is available.

Again, it is possible to additionally allocate 75 Mbps, that is, 75 Mbps being ½ of the 150 Mbps, to nodes 1 and 2, respectively, that is, 38 Mbps to each of nodes 1 and 2.

Accordingly, the fairness transmission rate which is advertised again is 213 Mbps which becomes 175 Mbps plus 38 Mbps (S17).

Performance of a method of allocating bandwidth by another RPR fairness mechanism and performance of a method of allocating bandwidth in accordance with the present invention are compared and evaluated using a simulation. The simulation makes use of a network simulator version 2.

Figure 6:
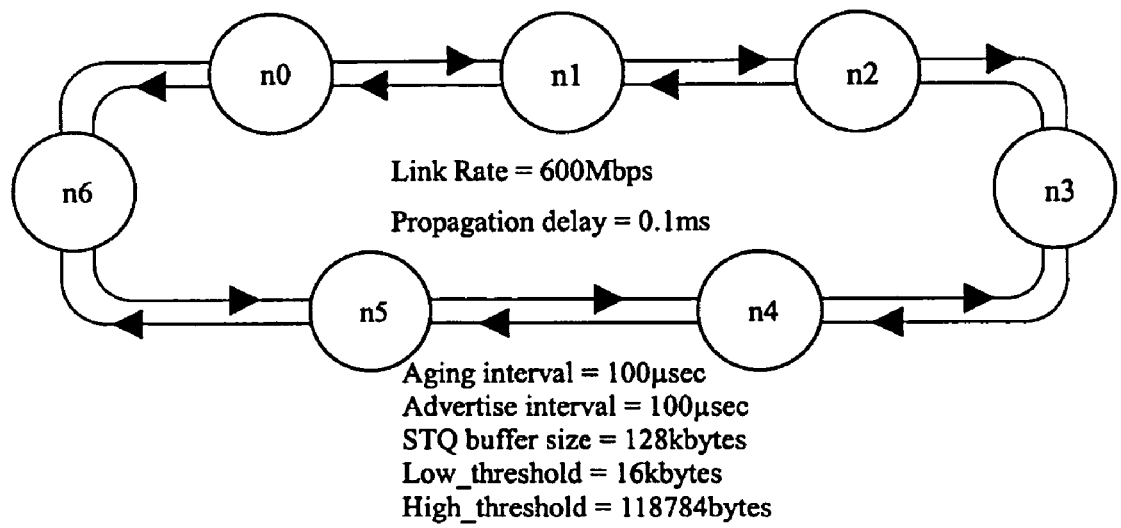
FIG. 6 is an RPR simulation network structure view to test performance of a method of allocating bandwidth using an RPR fairness mechanism in accordance with an embodiment of the present invention.

FIG. 6 is view of an RPR simulation network structure to test the performance of a method of allocating bandwidth using an RPR fairness mechanism in accordance with an embodiment of the present invention.

The bandwidths of two rings are 600 Mbps, respectively, and a propagation delay time between one node and another node is 0.1 ms. The STQ buffer size of all of the nodes is 128 kbytes, and the low_threshold is 16 kbytes (STQ_buffer_size/8), and the high_threshold is 118784 bytes (STQ_buffer_size−MTU (9216 bytes). Also, an aging interval and an advertise interval of all nodes are both 100 µs.

Figure 7:
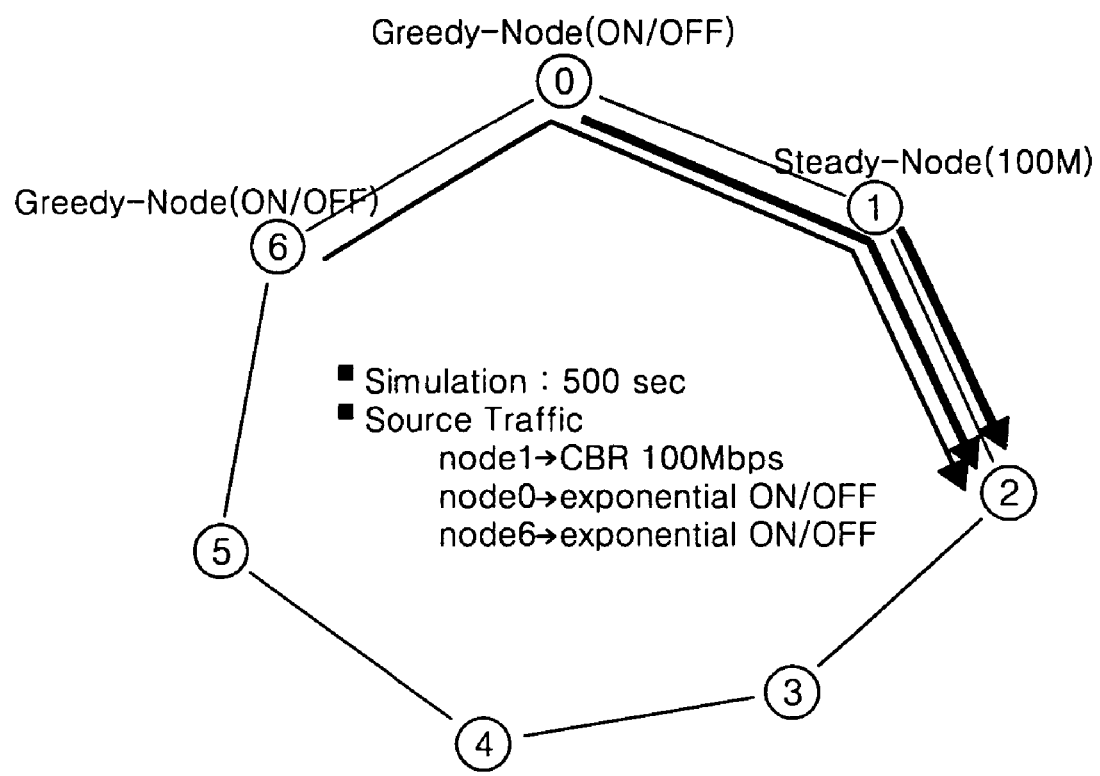
FIG. 7 is a traffic transmission flowchart in an RPR simulation to test performance of a method of allocating bandwidth using an RPR fairness mechanism in accordance with an embodiment of the present invention.

FIG. 7 is a traffic transmission flowchart in the RPR simulation to test performance of a method of allocating bandwidth using an RPR fairness mechanism in accordance with an embodiment of the present invention. Referring to FIG. 7, nodes 6 and 0 transmit the traffic to the node 2 in a greedy fashion. Also, the ON/OFF traffic of an exponential distribution has occurred for an Internet traffic current burst characteristic. The traffic is transmitted during an ON period, and it is not transmitted during an OFF period. Node1 transmits Constant Bit Rate (CBR) traffic to the node 2 at a fixed transmission rate of 100 Mbps. This periodically generates congestion and congestion solutions in node 1.

Figure 8:
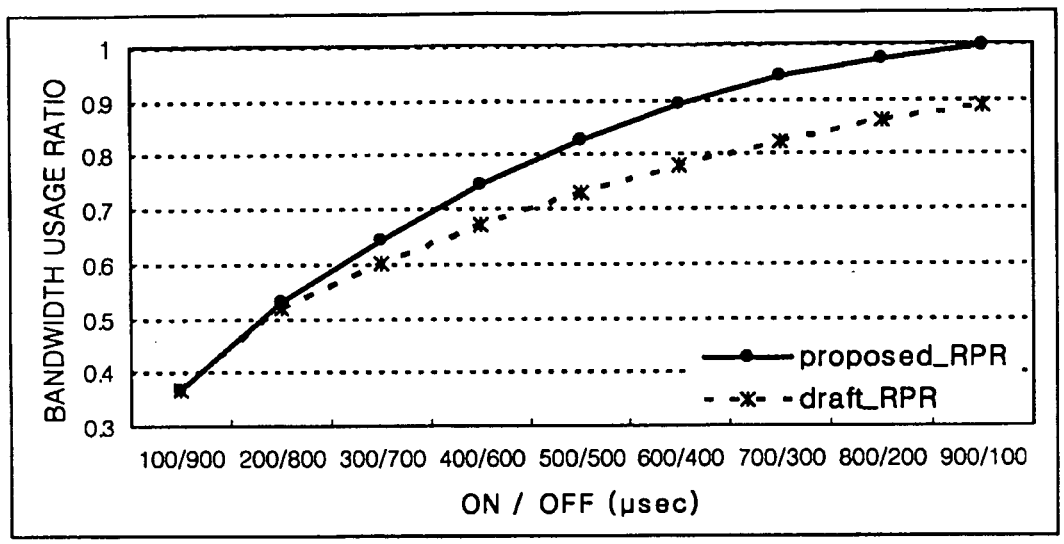
FIG. 8 is a bandwidth usage ratio comparison graph comparing another method with an RPR fairness mechanism in accordance with an embodiment of the present invention when the traffic is transmitted when the ON/OFF total period is 1000 μs.

FIG. 8 is a bandwidth usage ratio comparison graph comparing another method and the present invention when the traffic is transmitted in the case that the ON/OFF total period is 1000 µs. Referring to FIG. 8, when the ON/OFF total periods in nodes 6 and 0 are 1000 µs, the ON periods are increased by 100 µs in the range of from 100 µs to 900 µs, and the OFF periods are decreased by 100 µs in the range of from 900 µs to 100 µs, the total bandwidth usage ratios of all nodes being expressed. When the ON period is short and the OFF period is long when the ON/OFF periods are 100/900 µs and 200/800 µs so that congestion hardly occurs, it can be seen that the bandwidth usage ratios of another method and the present invention are similar but the bandwidth usage ratio of the method for allocating the bandwidth in accordance with the present invention becomes better than that of the another method as the ON period is increased and the OFF period is decreased. This is because congestion occurs more and more as the ON period is increased and the OFF period is decreased, and the bandwidth is more efficiently used after congestion has occurred in the method for allocating the bandwidth in accordance with the present invention.

Figure 9:
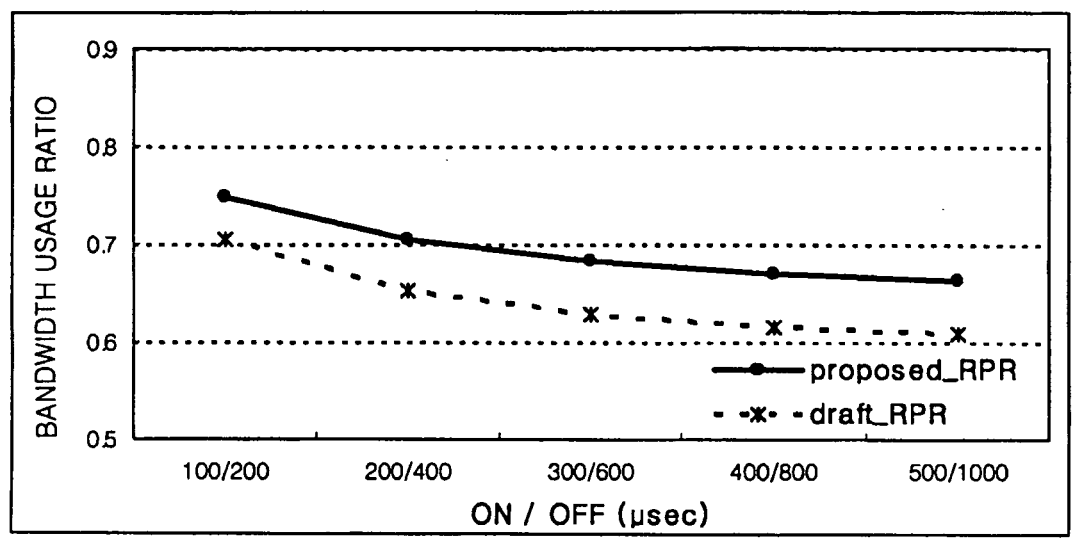
FIG. 9 is a bandwidth usage ratio comparison graph comparing another method with an RPR fairness mechanism in accordance with an embodiment of the present invention when ON/OFF traffic of a 1:2 ratio is transmitted.

FIG. 9 is a bandwidth usage ratio comparison graph comparing another method and the present invention when ON/OFF traffic of a 1:2 ratio is transmitted. Referring to FIG. 9, when two nodes 6 and 0 transmit the traffic while setting their ON/OFF ratios to 1:2, and increasing the ON/OFF periods, the total bandwidth usage ratios of the nodes are shown. Here, it can be seen that the bandwidth usage ratio of the method for allocating the bandwidth in accordance with the present invention is higher than that of another method. However, the reason why the total bandwidth usage ratio is reduced when the ON/OFF periods are increased while maintaining the ON/OFF interval as 1:2 is that even though the ON/OFF intervals are same as 1:2, congestion occurs more and more as the ON period is increased.

Figure 10:
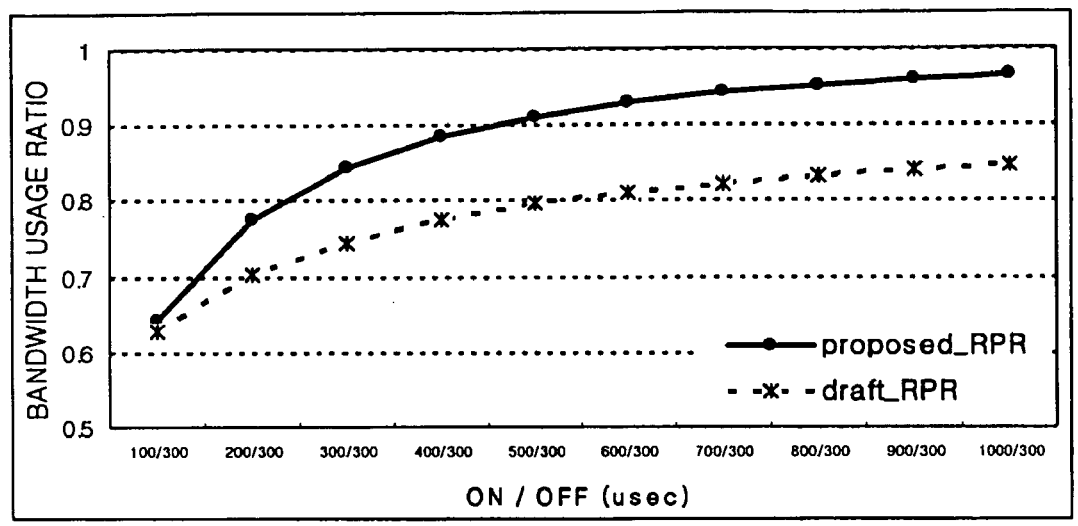
FIG. 10 is a bandwidth usage ratio comparison graph comparing another method with an RPR fairness mechanism in accordance with an embodiment of the present invention when ON/OFF traffic of an X:3 ratio is transmitted.

FIG. 10 is a bandwidth usage ratio comparison graph comparing another method and the present invention when ON/OFF traffic of an X:3 is transmitted. Referring to FIG. 10, when the nodes 6 and 0 transmit the traffic while setting the OFF periods to 300 µs and increasing the ON period by 100 µs in the range of from 100 µs to 1000 µs, the total bandwidth ratio of all nodes is expressed. Here, it is possible to confirm that the bandwidth usage ratio in the method for allocating the bandwidth in accordance with the present invention is higher than that of the another method.

Figure 11:
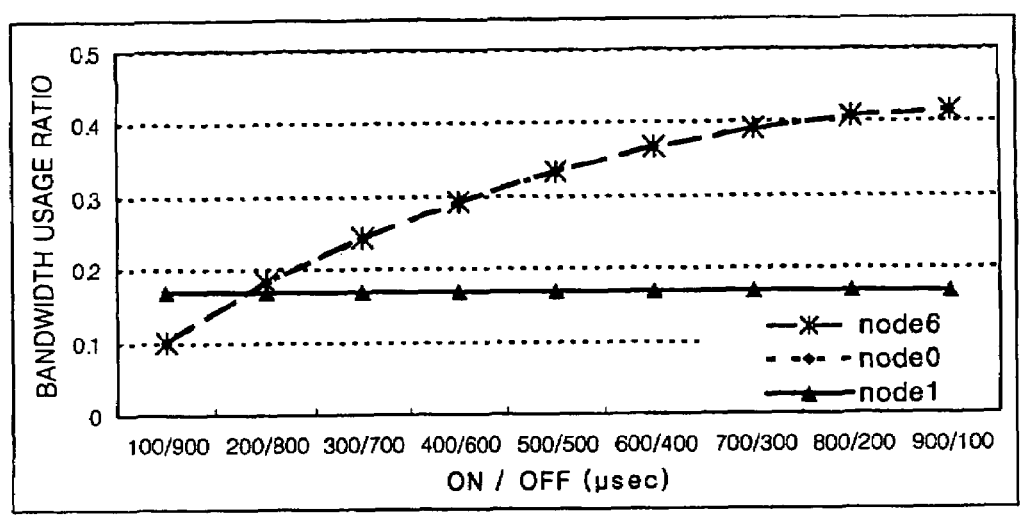
FIG. 11 is a graph of bandwidth usage ratios of nodes 6, 0 and 1 in the simulation of FIG. 8.

FIG. 11 is a graph of the bandwidth usage ratio of nodes 6, 0 and 1 in the simulation of FIG. 8. Referring to FIG. 11, since the node 1 transmits fixed traffic at 100 Mbps, the bandwidth usage ratio of node 1 has a fixed value. However, the bandwidth usage ratios of nodes 6 and 0 are increased as the ON period is increased and the OFF period is decreased. Also, since the two nodes have almost same bandwidth usage ratios, it is confirmed that nodes 6 and 0 use the bandwidth by dividing it fairly.

As described above, the present invention provides an improved method of allocating the bandwidth to solve the congestion problem that occurs in the RPR fairness mechanism defined in IEEE 802.17 and the problem that the bandwidth cannot be effectively used after congestion has been solved.

In the method for allocating the bandwidth in accordance with the present invention, when congestion occurs and is solved in a node, the node in which the congestion occurs can predict the number of nodes which are currently transmitting the traffic to the node, and can fairly allocate a currently available bandwidth to the nodes which are currently transmitting the traffic so that the bandwidth usage ratio can be enhanced.

Also, since the node in which congestion has occurred continues to measure the fairness transmission rate advertised by the node and the amount of the traffic transmitted to its STQ transmission buffer from the upstream nodes, it is possible to know the number of upstream nodes currently transmitting the traffic to the node and how much bandwidth of the total bandwidth can be used when an aging interval is completed.

Accordingly, the bandwidth usage ratio can be enhanced by the method of allocating bandwidth in accordance with the present invention which is currently available to source nodes at a fixed ratio rather than another method wherein source nodes increase traffic transmission gradually by advertising the transmission rate of the FULL value without considering the currently available bandwidth after congestion has been solved.

Also, it has been confirmed that the method of allocating bandwidth in accordance with the present invention has a higher bandwidth usage ratio rather than another method bandwidth usage ratio in the traffic transmission of various burst characteristics in the results of a performance analysis using ON/OFF traffic of the exponential distribution in conformity to an Internet traffic current burst characteristic and using a network simulator ns-2.

What is claimed is:

1. A method comprising:
   determining whether congestion has occurred in a node connected to an RPR (Resilient Packet Ring) network during every aging interval;
   upon a determination that congestion occurred, defining a first fairness transmission rate as a first amount of traffic that the node has transmitted to a ring during one aging interval to reduce the amount of the traffic inputted from an upstream node, recording the first amount of the traffic together with its own identifier in a fairness message, advertising the recorded amount to upstream nodes and storing the first fairness transmission rate;

measuring and storing a second amount of traffic that has been reduced in accordance with the first fairness transmission rate during the one aging interval and has been transmitted from the upstream node; and upon the congestion having been eliminated, calculating an available bandwidth in accordance with the stored first fairness transmission rate and the second amount of traffic, and determining a second fairness transmission rate in accordance with the calculated available bandwidth and transmitting the second fairness transmission rate to the upstream nodes.

2. The method according to claim 1, wherein determining whether congestion has occurred in a node connected to a Resilient Packet Ring (RPR) network during every aging interval includes testing a Secondary Transit Queue (STQ) buffer of the node and determining that congestion has occurred upon an amount of traffic being equal to or greater than a low threshold.

3. The method according to claim 1, wherein a first traffic comprises a Class-C (Low Priority) traffic and an eMP(Excess Medium Priority) traffic.

4. The method according to claim 1, wherein second fairness transmission rate is determined by:

calculating the number of upstream nodes that have transmitted the second amount of traffic to the node;

calculating a bandwidth which is currently being used and a bandwidth which is not used but is available with respect to a total bandwidth with reference to the number of upstream nodes; and determining the second fairness transmission rate to increase the traffic inputted from the upstream node by assigning a preselected portion of the calculated available bandwidth to the first fairness transmission rate.

5. The method according to claim 4, wherein calculating the number of upstream nodes includes calculating the amount of the traffic which has been transmitted to a Secondary Transit Queue (STQ) buffer during a current aging interval divided by the first fairness transmission rate which the node has most recently advertised to the number of upstream nodes.

6. The method according to claim 4, wherein calculating the available bandwidth includes:

determining a value calculated by multiplying the number of nodes including the node in which the congestion has occurred and the upstream node which is transmitting the traffic to the node, and the first fairness transmission rate which the node has the most recently advertised as the bandwidth which is currently being used; and determining a value calculated by subtracting the bandwidth which is currently being used from a current total bandwidth as the available bandwidth.

7. The method according to claim 4, wherein the preselected portion of the calculated available bandwidth is ½ of the available bandwidth.

8. The method according to claim 4, wherein determining the second fairness transmission rate includes establishing a value calculated by adding the value calculated by dividing the predetermined portion of the calculated available bandwidth by the number of the upstream nodes which are transmitting the traffic to the node at a previous fairness transmission rate as the second fairness transmission rate.

9. The method according to claim 1, wherein each recorded node identifier is a Media Access Control (MAC) address.

10. The method according to claim 1, further comprising transmitting a fairness transmission rate of a FULL value to the upstream nodes when the bandwidth which is currently being used is equal to or greater than a preselected portion of a total bandwidth with reference to the number of upstream nodes.

11. The method according to claim 10, wherein the preselected portion of the total bandwidth is 95% of the total bandwidth.

12. A program storage device, readable by a machine, tangibly embodying a program of instructions executable by the machine to perform a method of allocating bandwidth using a Resilient Packet Ring (RPR), the method comprising:

determining whether congestion has occurred in a node connected to an RPR (Resilient Packet Ring) network during every aging interval;

upon a determination that congestion occurred, defining a first fairness transmission rate as a first amount of traffic that the node has transmitted to a ring during one aging interval to reduce the amount of the traffic inputted from an upstream node, recording the first amount of the traffic together with its own identifier in a fairness message, advertising the recorded amount to upstream nodes and storing the first fairness transmission rate;

measuring and storing a second amount of traffic that has been reduced in accordance with the first fairness transmission rate during the one aging interval and has been transmitted from the upstream node; and upon the congestion having been eliminated, calculating an available bandwidth in accordance with the stored first fairness transmission rate and the second amount of traffic, and determining a second fairness transmission rate in accordance with the calculated available bandwidth and transmitting the second fairness transmission rate to the upstream nodes.

* * * * *